(No Model.)

G. Q. SEAMAN, A. WILSON & W. JONES.
SAFETY CAR FENDER.

No. 516,408. Patented Mar. 13, 1894.

WITNESSES:
J. A. Bergstrom
C. Sedlanek

INVENTORS
G. Q. Seaman
A. Wilson
W. Jones
BY Munn & Co.
ATTORNEYS.

THE NATIONAL LITHOGRAPHING COMPANY,
WASHINGTON, D. C.

UNITED STATES PATENT OFFICE.

GEORGE Q. SEAMAN, ALEXANDER WILSON, AND WILLIAM JONES, OF BROOKLYN, NEW YORK.

SAFETY CAR-FENDER.

SPECIFICATION forming part of Letters Patent No. 516,408, dated March 13, 1894.

Application filed July 14, 1893. Serial No. 480,477. (No model.)

*To all whom it may concern:*

Be it known that we, GEORGE Q. SEAMAN, ALEXANDER WILSON, and WILLIAM JONES, all of Brooklyn, in the county of Kings and State of New York, have invented a new and useful Safety Car-Fender, of which the following is a full, clear, and exact description.

Reference is to be had to the accompanying drawings forming a part of this specification, in which similar figures of reference indicate corresponding parts in all the views.

Figure 1:
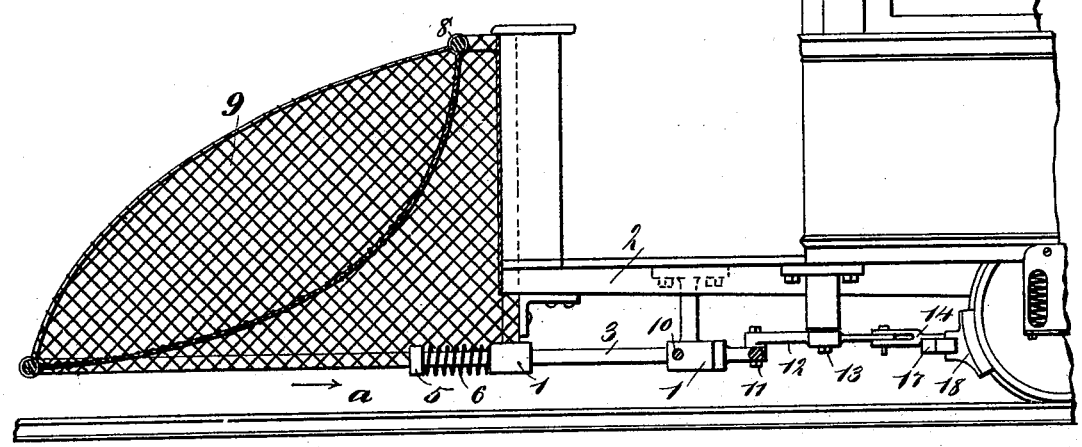
Figure 2:
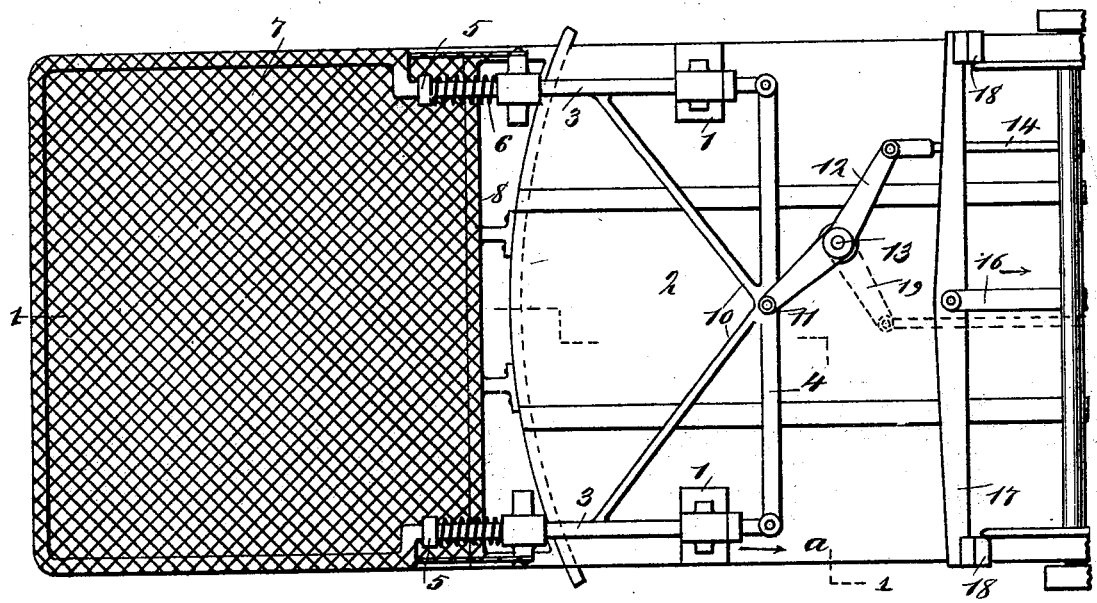
Figure 3:
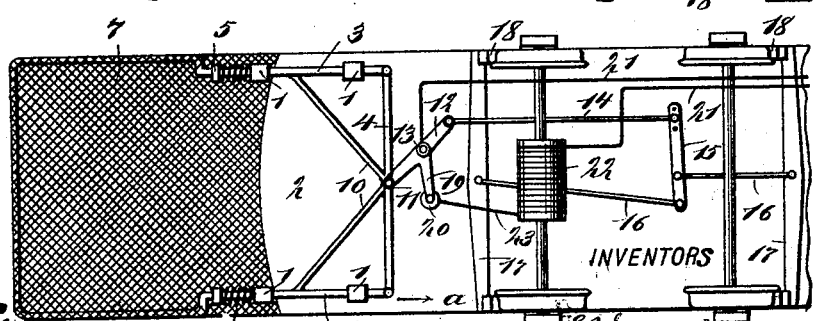

Figure 1 is a side elevation, partly in section on the line 1—1 of Fig. 2, of the end of a cable car having our safety car fender attached to it. Fig. 2 is an inverted plan view of the same; and Fig. 3 is a similar view of an electric car fitted with our improvement.

The object of our invention is to provide a safety device for cable cars, electric cars and the like, which will effectively prevent persons falling in front of the car from getting below the same and being injured thereby, and which, at the same time will operate to automatically stop the car when it strikes a person or against an obstacle.

Another object of the invention is to reduce the force of the shock when a person is struck by the car.

To these ends the invention consists in an improved construction of the fender, and certain details of the operating mechanism connected therewith.

The invention will be fully disclosed hereinafter, and the features of novelty pointed out in the claims.

As illustrated in Figs. 1, 2 and 3, bearings 1 are secured to the under side of the car bottom 2, and these bearings are adapted to receive and guide the longitudinal side pieces 3 of an essentially rectangular frame 4. Collars 5 are provided on the side pieces 3 in front of the outer bearings 1, and springs 6 are coiled between the said bearings and the said collars, the springs 6 operating to force the frame 4 outwardly at the end of the car. A curved elastic guard 7, preferably a network made of any suitable material, is secured to the outer end of the frame 4, and to a transverse bar 8, or an equivalent part which is rigidly connected with the car frame. Vertical side guards 9 are provided longitudinally at both sides of the guard 7.

The frame 4 may be provided with braces, as shown at 10. To the inner transverse bar of the frame, and preferably at the center thereof, 11, is pivoted a lever 12, fulcrumed at 13 on a bracket depending from the car bottom. The opposite end of the lever is pivotally connected with a connecting rod 14, which is adapted to operate the brakes through the medium of suitable connections, for instance, in the manner illustrated in Fig. 3. The connecting rod 14 is pivotally connected with the swinging cross bar 15 (not fulcrumed) to which are pivoted the brake levers 16 secured to the cross bars 17 carrying the brake blocks 18. The lever 12 is provided with a lateral arm 19, which is connected with the grip, when the device is applied to a cable car, as indicated in Fig. 2. When the improvement is employed in connection with an electric car, as shown in Fig. 3, the arm 19 is normally in contact with a button 20 to close the electric circuit between the wires 21 and the motor 22, one of the said wires being electrically connected with the lever 12, and another connecting wire, 23, leads from the motor 22 to the button 20.

The operation of the car fender will be obvious. When a person crosses the track in front of the car and is struck by the fender, the frame 4 will slide in the bearings 1 as indicated by the arrows *a*, and the springs 6 will considerably reduce the force of the shock. It will be observed that the curved guard 7 practically forms a scoop-like and upwardly inclined surface, and that the guard will not come in contact with the dash board of the car when a person is thrown upon the fender. The upwardly curved shape of the guard 7 will enable it to yield considerably and thereby reduce to a minimum the danger of the person being injured by the concussion. The person will be caught in the open space between the guards 7 and 9, and the latter will prevent the person from falling out at the side. The frame 4 moving inward turns the lever 12 and the brakes are applied through the medium of the several levers and cross bars connected with the lever 12. At the same time, the arm 19 of the lever 12 operates the grip to release the cable, or, if the car is an electric car, the circuit is broken by the movement of the said arm 19.

It will be obvious that the apparatus can be applied to cars where an expansible gas or vapor is employed as a propelling agent, and it will be understood that in such cars the arm 19 will be connected with a valve plug or valve stem to automatically cut off the supply of steam or equivalent agent from the motor.

The invention insures an almost instantaneous stoppage of the car in case a person should be struck by the fender, whereby a very high degree of security against accident is attained. It will be observed that the car will also be stopped if the fender strikes a carriage or any other obstacle that may be on the track.

We do not confine ourselves to the form of construction shown in the accompanying drawings, as it will be obvious that modifications may be devised without departing from the principle of the invention.

Having thus described our invention, we claim as new and desire to secure by Letters Patent—

1. In a car, a safety fender comprising a curved, upwardly inclined bottom or guard secured at its upper and lower edges, but loose in its main portion so as to form a yielding pocket, the central portion of which is capable of moving in relation to the edges, and side guards arranged adjacent to the said curved guard, as and for the purpose set forth.

2. In a car, the combination, with the frame capable of a sliding movement longitudinally of the car and arranged adjacent to the bottom thereof, means for restoring the frame to its normal or forward position, and a cross bar rigidly connected with the car frame in front of the dash board and near to the upper end of the latter, of a curved bottom guard suspended from the said cross bar and secured to the front end of the sliding frame, and side guards extending essentially from the said cross bar to the front end of the frame, substantially as described.

3. The combination, with a car and bearings suspended beneath the same, of a fender capable of a longitudinal sliding movement in the said bearings, a lever fulcrumed on the car and pivotally connected with the fender, a loose, not fulcrumed, swinging bar, cross bars or beams carrying the brakes, and rods connecting the said swinging bar with the said pivoted lever and the brake beams of the front and rear wheels respectively, substantially as described.

4. In a cable car, a safety fender, comprising a frame capable of a yielding longitudinal movement in relation to the car, a lever centrally connected with the inner end of the fender frame and pivoted to the car frame, said lever having a lateral arm, a connection between the said lever and the brakes, and a connection between the said lateral arm and the grip, substantially as described.

GEORGE Q. SEAMAN.
ALEXANDER WILSON.
WILLIAM JONES.

Witnesses:
HENRY F. POWELL,
LOUIS BRAEMER, Jr.